US008354202B2

(12) United States Patent
Querel et al.

(10) Patent No.: US 8,354,202 B2
(45) Date of Patent: Jan. 15, 2013

(54) MULTILAYER GLASS-CERAMIC SEALS FOR FUEL CELLS

(75) Inventors: Gilles Querel, Worcester, MA (US); Shailendra S. Parihar, Marlborough, MA (US); George K. Parker, Stowe, VT (US); Patrick Garnier, Paris (FR)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 653 days.

(21) Appl. No.: 12/316,800

(22) Filed: Dec. 16, 2008

(65) Prior Publication Data

US 2009/0197135 A1  Aug. 6, 2009

Related U.S. Application Data

(60) Provisional application No. 61/008,650, filed on Dec. 21, 2007.

(51) Int. Cl.
*H01M 2/08* (2006.01)
*H01M 8/24* (2006.01)

(52) U.S. Cl. ......... 429/508; 429/509; 429/466; 429/495

(58) Field of Classification Search .................. 429/507, 429/508, 509, 510, 495, 479, 519, 520, 523, 429/532, 460, 465, 466; 427/115
See application file for complete search history.

(56) References Cited

U.S. PATENT DOCUMENTS

| 5,453,331 | A | 9/1995 | Bloom et al. |
| 6,165,632 | A * | 12/2000 | Blum et al. ............ 429/452 |
| 6,430,966 | B1 | 8/2002 | Meinhardt et al. |
| 6,541,146 | B1 | 4/2003 | Xue et al. |
| 6,828,263 | B2 | 12/2004 | Larsen et al. |
| 2003/0203267 | A1 | 10/2003 | Chou et al. |
| 2006/0172875 | A1 | 8/2006 | Cortright et al. |

FOREIGN PATENT DOCUMENTS

| DE | 43 34 438 A1 | 4/1995 |
| EP | 0 907 215 A | 4/1999 |
| EP | 0 907 215 A1 | 4/1999 |
| JP | 10-321244 | 4/1998 |

(Continued)

OTHER PUBLICATIONS

Notification of Transmittal of the International Search Report and the Written Opinion of the International Searching Authority, or the Declaration for Application No. PCT/US2008/013740, mailed Sep. 11, 2009, consisting of 16 pages.
Singh, R. N., et al., "Layered Composite Seals for Solid Oxide Fuel Cells (SOFC)," *Advances in Solid Oxide Fuel Cells, The American Ceramic Society*, pp. 247-255 (2005) (No month available).

(Continued)

*Primary Examiner* — Raymond Alejandro
(74) *Attorney, Agent, or Firm* — Robert T. Conway; Abel Law Group, LLP

(57) ABSTRACT

A fuel cell includes a ceramic component and a sealing component. The sealing component includes a first glass-ceramic layer over the ceramic component and a second glass-ceramic layer over the first glass-ceramic layer, each of the first and the second glass-ceramic layers independently including between about 0.5% and about 50% glass phase content by volume. The first glass-ceramic layer includes a higher glass phase content than the second glass-ceramic layer, and between about 0.5% and about 10% glass stabilizer component by weight.

14 Claims, 7 Drawing Sheets

FOREIGN PATENT DOCUMENTS

| | | |
|---|---|---|
| WO | WO 99/54131 | 10/1999 |
| WO | WO 2004/063110 A2 | 7/2004 |
| WO | WO 2004/063110 A3 | 10/2004 |
| WO | WO 2004/063110 A3 | 12/2004 |
| WO | WO 2007/120545 A | 10/2007 |
| WO | WO 2007/120545 A2 | 10/2007 |

OTHER PUBLICATIONS

International Preliminary Report on Patentability and Written Opinion of the International Searching Authority, International Application No. PCT/US2008/013740, date of mailing Jul. 1, 2010.

* cited by examiner

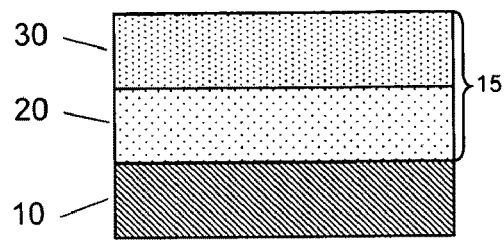
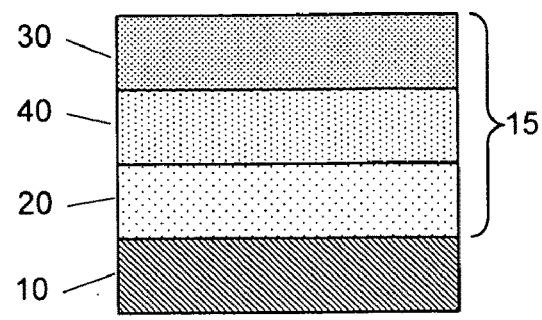
FIG. 1A
FIG. 1B
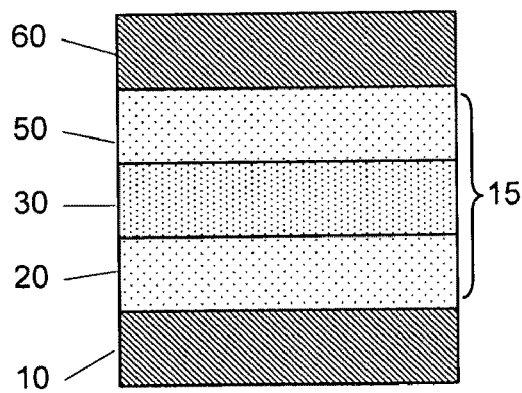
FIG. 2

MULTILAYER GLASS-CERAMIC SEALS FOR FUEL CELLS

RELATED APPLICATION

This application claims the benefit of U.S. Provisional Application No. 61/008,650, filed on Dec. 21, 2007, the entire teachings of which are incorporated herein by reference.

BACKGROUND OF THE INVENTION

A fuel cell is a device that generates electricity by a chemical reaction. Typically, in a fuel cell, an oxygen gas, such as $O_2$, is reduced to oxygen ions ($O^{2-}$) at the cathode, and a fuel gas, such as $H_2$, is oxidized with the oxygen ions to form water at the anode. Among various types of fuel cells, solid oxide fuel cells (SOFCs) use hard ceramic compounds of metal oxides (e.g., calcium or zirconium oxides) to form components of the fuel cell, such as, for example, the anode, cathode, electrolyte, and interconnect. Generally, the fuel gas is separated from the oxygen gas stream with leak-tight seals. Generally, in SOFCs, leak-tight seals separating the fuel gas from the oxygen gas are exposed to elevated temperatures (e.g. 600-800° C.) during normal operation. Glasses or glass-ceramic materials typically have been used for such leak-tight seals.

Glass materials generally are known to be flexible and compliant at temperatures above their glass transition temperature. Such high flexibility is desirable in order to reduce mechanical stresses caused by the difference in thermal expansion coefficient (CTE) between the sealing material and the ceramic fuel cell component(s) that is being sealed or bonded. Glass materials, however, generally are not chemically stable when exposed to the hydrogen fuel gas or other metallic or ceramic fuel cell components. In addition, glass materials tend to crystallize and lose their flexibility over time when exposed to the elevated temperatures of normal operation of SOFCs.

Although ceramic materials have excellent long term chemical and thermal stability, ceramic materials are generally not compliant at the elevated temperatures of normal operation of SOFCs. Seals and bonds composed of ceramic materials generally induce substantial thermal stresses on the cell components during SOFC operation.

Therefore, there is a need for the development of new sealing and/or bonding materials for fuel cells, in particular materials that can have higher flexibility and also higher mechanical, chemical, and thermo-physical stability.

SUMMARY OF THE INVENTION

The present invention relates to a fuel cell comprising a multi-layer glass-ceramic sealing component, and to a method of sealing a ceramic component of a fuel cell by employing such a multi-layer glass-ceramic sealing component.

In one embodiment, the invention is directed to a fuel cell that includes a ceramic component and a sealing component. The sealing component includes a first glass-ceramic layer over the ceramic component and a second glass-ceramic layer over the first glass-ceramic layer, each of the first and the second glass-ceramic layers independently including between about 0.5% and about 50% glass phase content by volume. The first glass-ceramic layer includes a higher glass phase content than the second glass-ceramic layer, and between about 0.5% and about 10% glass stabilizer component by weight. In one embodiment, the glass stabilizer component includes at least one compound selected from the group consisting of $B_2O_3$, $Bi_2O_3$, $Li_2O$, $Na_2O$, $K_2O$, $Rb_2O$, $Cs_2O$, $Sb_2O_3$, $SnO$, $La_2O_3$, and $PbO$. In a specific embodiment, the glass stabilizer component includes $B_2O_3$. In another specific embodiment, the first glass-ceramic layer includes between about 10% and about 40% glass phase content by volume, and the second glass-ceramic layer includes between about 5% and about 25% glass phase content by volume. In another embodiment, the first glass-ceramic layer includes between about 1% and about 5% $B_2O_3$ by weight. In a specific embodiment, the first glass-ceramic layer includes between about 1% and about 2% $B_2O_3$ by weight. In another embodiment, each of the first and the second glass-ceramic layer includes $SiO_2$. In yet another embodiment, each of the first and the second glass-ceramic layers independently further includes at least one compound selected from the group consisting of $Al_2O_3$, BaO, CaO, MgO, ZnO, SrO, $TiO_2$, and $Y_2O_3$. In a specific embodiment, the first glass-ceramic layer includes between about 2% and 12% $Al_2O_3$ by weight, between about 35% and between about 55% BaO by weight, between about 30% and about 45% $SiO_2$ by weight, and between about 0.5% and about 3% $TiO_2$ by weight, and the second glass-ceramic layer includes between about 10% and about 15% $Al_2O_3$ by weight, between about 35% and between about 55% BaO by weight, between about 30% and about 45% $SiO_2$ by weight, and between about 0.5% and about 3% $TiO_2$ by weight. In another embodiment, the invention is directed to a fuel cell that includes a third glass-ceramic layer between the first and the second glass-ceramic layers, wherein the third glass-ceramic layer includes a lower glass phase content than the first glass-ceramic layer, and includes a higher glass phase content than the second glass-ceramic layer. In a specific embodiment, the fuel cell includes a third glass-ceramic layer over the second glass-ceramic layer, and a second ceramic component opposite the first ceramic component and over the third glass-ceramic layer, wherein the third glass-ceramic layer includes between about 0.5% and about 50% glass phase content by volume and includes between about 0.5% and about 10% glass stabilizer component by weight, and wherein the glass phase content of the third glass-ceramic layer is higher than the glass phase content of the second glass-ceramic layer. In some embodiments, the fuel cell is a solid oxide fuel cell, and the ceramic component includes a component selected from the group consisting of an anode, a cathode, an electrolyte and an interconnect. In a specific embodiment, the first and the second ceramic components include a component selected from the group consisting of an anode, a cathode, an electrolyte, and an interconnect.

In another embodiment, the present invention is directed to a method of sealing a ceramic component of a fuel cell. In the method, a first coat is applied over a first ceramic component of the fuel cell, the first coat including $SiO_2$, and further including between about 0.5% and about 10% glass stabilizer component by weight. A second coat is applied over the first coat, the second coat including $SiO_2$. The first and second coats are heated to form a sealing component, to thereby seal the ceramic component with the sealing component. The formed sealing component includes a first glass-ceramic layer over the ceramic component and a second glass-ceramic layer over the first glass-ceramic layer, each of the first and the second glass-ceramic layers independently including between about 0.5% and about 50% glass phase content by volume, wherein the first glass-ceramic layer includes a higher glass phase content than the second glass-ceramic layer. In one embodiment, the glass stabilizer component includes at least one compound selected from the group consisting of $B_2O_3$, $Bi_2O_3$, $Li_2O$, $Na_2O$, $K_2O$, $Rb_2O$, $Cs_2O$, $Sb_2O_3$, $SnO$, $La_2O_3$, and $PbO$. In a specific embodiment, the glass stabilizer component includes $B_2O_3$. In some embodiments, each of the first and the second coats further includes a polymeric vehicle. In some specific embodiments, the polymeric vehicle includes at least one of a binder, a plasticizer and a dispersant. In another embodiment, heating the first and second coats includes steps of maintaining the first and the second coats at a first temperature range sufficient to cause formation of polymeric-vehicle-deficient layers, thereafter maintaining the polymeric-vehicle-deficient layers at a second temperature range sufficient to cause formation of sintered layers, and thereafter maintaining the sintered layers at a third temperature range sufficient to cause formation of the first and the second glass-ceramic layers. In a specific embodiment, the first temperature range is between about 200° C. and about 600° C., the second temperature range is between about 700° C. and about 1050° C., and the third temperature range is between about 800° C. and about 1100° C. In another embodiment, maintaining of the layers at least one of the first, the second, and the third temperature ranges includes maintaining the layers at a first temperature and thereafter maintaining the layers at a second temperature distinct from the first temperature. In yet another embodiment, the first coat and the second coat are maintained at each of the first, second, and third temperature ranges for a time period of between about 30 minutes and about 300 minutes. In a specific embodiment, the first glass-ceramic layer includes between about 10% and about 40% glass phase content by volume, and the second glass-ceramic layer includes between about 5% and about 25% glass phase content by volume. In another embodiment, the method includes applying a third coat including $SiO_2$ between the first coat and the second coat, and heating the first, the second, and the third coats to form the sealing component that includes the first, the second, and the third glass-ceramic layers over the ceramic component, the third glass-ceramic layer including between about 0.5% and about 50% glass phase content by volume, wherein the third glass-ceramic layer includes a lower glass phase content than the first glass-ceramic layer, and includes a higher glass phase content than the second glass-ceramic layer. In one embodiment, heating the first, the second, and the third coats includes the steps of maintaining the first, the second, and the third coats at a first temperature range sufficient to cause formation of polymeric-vehicle-deficient layers, thereafter maintaining the polymeric-vehicle-deficient layers at a second temperature range sufficient to cause formation of sintered layers, and thereafter maintaining the sintered layers at a third temperature range sufficient to cause formation of the first, second, and third glass-ceramic layers. In a specific embodiment, the first temperature range is between about 200° C. and about 600° C., the second temperature range is between about 700° C. and about 1050° C., and the third temperature range is between about 800° C. and about 1100° C. In another embodiment, maintaining of the layers at least one of the first, second, and third temperature ranges includes maintaining the layers at a first temperature and thereafter maintaining the layers at a second temperature distinct from the first temperature. In one embodiment, the first coat and the second coat and the third coat are maintained at each of the first, second, and third temperature ranges for a time period of between about 30 minutes and about 300 minutes. In a specific embodiment, the first glass-ceramic layer includes between about 10% and about 40% glass phase content by volume, the second glass-ceramic layer includes between about 5% and about 25% glass phase content by volume, and the third glass-ceramic layer includes between about 10% and about 30% glass phase content by volume. In yet another embodiment, the method includes applying a third coat between a second ceramic component, located opposite the first ceramic component, and opposite the second coat, and heating the first, the second, and the third coats to form the sealing component that includes the first, the second, and the third glass-ceramic layers over the ceramic component, the third glass-ceramic layer including between about 0.5% and about 50% glass phase content by volume, wherein the glass phase content of the third glass-ceramic layer is higher than the second glass-ceramic layer, and wherein the third coat includes $SiO_2$ and between about 0.5% and about 10% glass stabilizer component by weight.

Multi-layer glass-ceramic seals and bonds, which are employed in the invention, can include the first glass-ceramic layer adjacent to the ceramic component, and the second glass-ceramic layer distal from the ceramic component. The higher glass phase content of the first glass-ceramic layer relative to that of the second glass-ceramic layer can provide high enough flexibility to withstand repeated thermal cycles during normal operation of a fuel cell (e.g., between room temperature and elevated, normal operation temperatures). On the other hand, the higher ceramic-phase content of the second glass-ceramic layer relative to that of the first glass-ceramic layer can provide mechanical, chemical and/or thermo-physical stability to compensate for the relatively low mechanical, chemical and/or thermo-physical stability of the first glass-ceramic layer. Thus, the multi-layer seals and bonds employed in the invention can provide a solution to the needs in the art for seals and bonds having high flexibility and, at the same time, high mechanical, chemical and/or thermo-physical stability.

The present invention can be used in a solid oxide fuel cell (SOFC) system. SOFCs offer the potential of high efficiency electricity generation, with low emissions and low noise operation. They are also seen as offering a favorable combination of electrical efficiency, co-generation efficiency and fuel processing simplicity. One example of a use for SOFCs is in a home or other building. The SOFC can use the same fuel as used to heat the home, such as natural gas. The SOFC system can run for extended periods of time to generate electricity to power the home and if excess amounts are generated, the excess can be sold to the electric grid. Also, the heat generated in the SOFC system can be used to provide hot water for the home. SOFCs can be particularly useful in areas where electric service is unreliable or non-existent.

BRIEF DESCRIPTION OF THE DRAWINGS

FIG. 1A is a schematic diagram of a fuel cell component sealed with two glass-ceramic layers of the invention.

FIG. 1B is a schematic diagram of a fuel cell component sealed with three glass-ceramic layers of the invention.

FIG. 2 is a schematic diagram of two fuel cell components bonded together using three glass-ceramic layers of the invention.

DETAILED DESCRIPTION OF THE INVENTION

Figure 3:
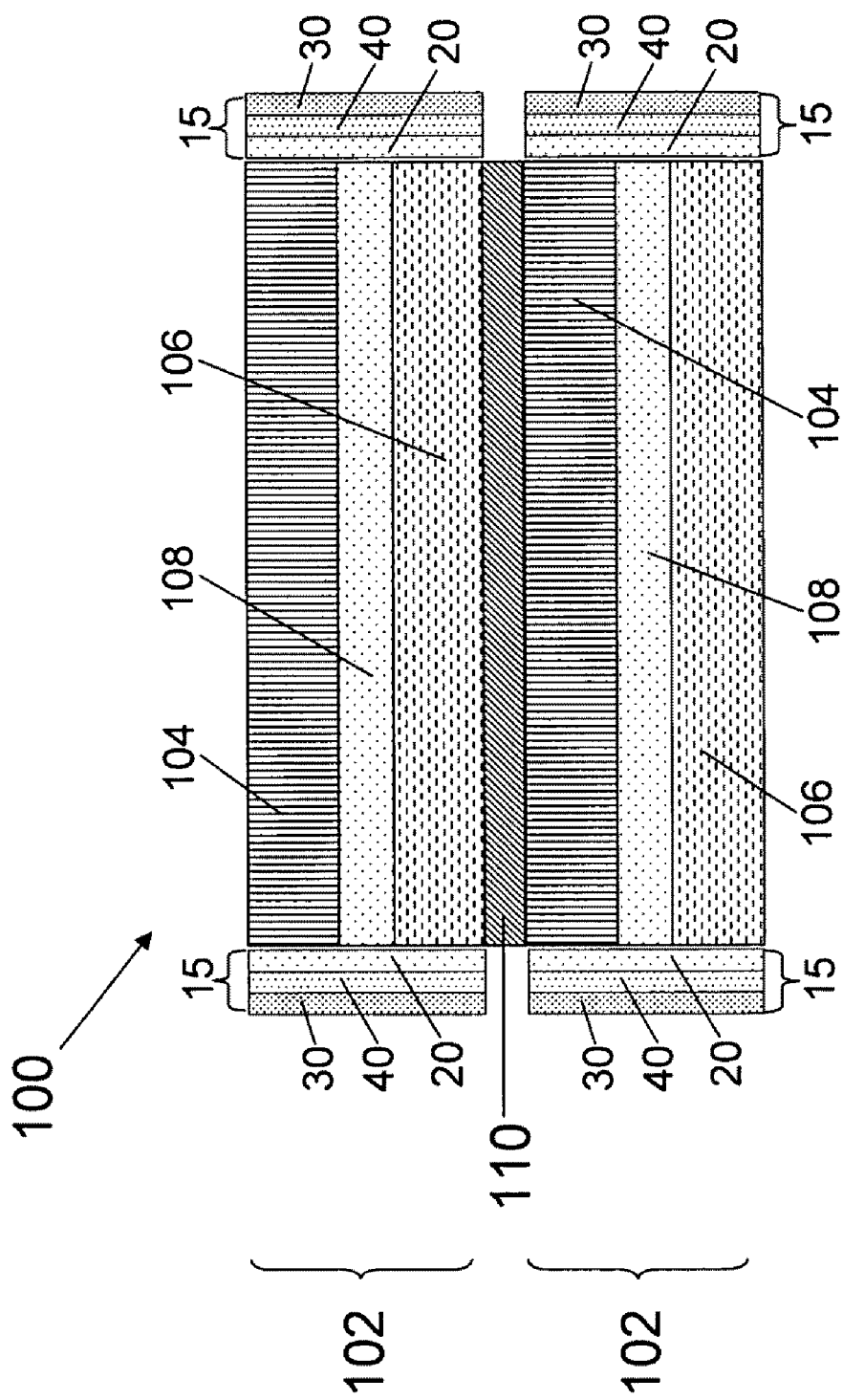
FIG. 3 is a schematic diagram of a fuel cell including a sealing component of the invention.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

A sealing component employed in the invention includes a plurality of glass-ceramic layers. Generally, the sealing component includes a glass-ceramic layer having the highest glass phase content (i.e., the lowest ceramic phase content) close to a ceramic component to be sealed, and a glass-ceramic layer having the lowest glass phase content (i.e., the highest ceramic phase content) distal from the ceramic component, generating a gradient of glass phase content (or a gradient of ceramic phase content). The term "glass phase," as used herein, has the meaning commonly afforded the term in the art, for example, an amorphous, inorganic, generally at least partially transparent solid. The term "ceramic phase," as used herein, also has the meaning commonly afforded the term in the art, for example, an at least partially crystallized phase. Generally, the content of glass phase or ceramic phase can be controlled by controlled crystallization of a parent glass (i.e., having 100% glass phase) to obtain the desired ceramic phase (crystallized phase) content. Typically, the glass-ceramic layers each independently have between about 0.5% and about 50% glass phase content by volume. In one example, the glass-ceramic layers each independently have between about 1% and about 50% glass phase content by volume. In another example, the glass-ceramic layers each independently have between about 5% and about 50% glass phase content by volume.

Referring now to FIG. 1A, first ceramic component 10 that is to be sealed supports sealing component 15 that includes first glass-ceramic layer 20 and second glass-ceramic layer 30, wherein first glass-ceramic layer 20 includes a higher glass phase content than second glass-ceramic layer 30. First ceramic component 10 can include an anode, cathode, electrolyte, or interconnect component of a fuel cell, specifically a SOFC.

Typically, each of first and second glass-ceramic layers 20 and 30 independently includes between about 0.5% and about 50% glass phase content by volume. In a specific embodiment, each of first and second glass-ceramic layers 20 and 30 independently includes between about 1% and about 50% glass phase content by volume. In another specific embodiment, each of first and second glass-ceramic layers 20 and 30 independently includes between about 5% and about 50% glass phase content by volume. In yet another specific embodiment, first glass-ceramic layer 20 includes between about 10% and about 40% glass phase content by volume, and second glass-ceramic layer 30 includes between about 5% and about 25% glass phase content by volume.

Typically, first glass-ceramic layer 20 includes between about 0.5% and about 10% by weight glass stabilizer that includes one or more glass stabilizers. In a specific embodiment, the content of the glass stabilizer component is between about 1% and about 5%, or between about 1% and about 2%. As used herein, the term "glass stabilizer" has the meaning commonly afforded the term in the art, for example, a material that increases the resistance of a glass to temperature change, mechanical shock and/or chemical corrosion. Examples of suitable glass stabilizers include $B_2O_3$, $Bi_2O_3$, $Li_2O$, $Na_2O$, $K_2O$, $Rb_2O$, $Cs_2O$, $Sb_2O_3$, $SnO$, $La_2O_3$, and $PbO$. One or more of these glass stabilizers can be used in the invention. In a specific embodiment, the glass stabilizer component includes $B_2O_3$. In a further specific embodiment, the glass stabilizer component includes between about 1% and about 5% $B_2O_3$ by weight. In another further specific embodiment, the glass stabilizer component includes between about 1% and about 2% $B_2O_3$ by weight.

Typically, each of first and second glass-ceramic layers 20 and 30 independently includes $SiO_2$, and can independently further include at least one compound selected from the group consisting of $Al_2O_3$, BaO, CaO, MgO, ZnO, SrO, $TiO_2$, and $Y_2O_3$. In a specific embodiment, each of first and second glass-ceramic layers 20 and 30 independently includes $SiO_2$, $Al_2O_3$, BaO, $SiO_2$, $TiO_2$ and $Y_2O_3$. In a further specific embodiment, first glass-ceramic layer 20 includes between about 2% and 12% $Al_2O_3$ by weight, between about 35% and between about 55% BaO by weight, between about 30% and about 45% $SiO_2$ by weight, between about 0.5% and about 3% $TiO_2$ by weight, and, optionally, between about 0.5% and about 25% $Y_2O_3$ by weight. In another further specific embodiment, second glass-ceramic layer 30 includes between about 10% and about 15% $Al_2O_3$ by weight, between about 35% and between about 55% BaO by weight, between about 30% and about 45% $SiO_2$ by weight, between about 0.5% and about 3% $TiO_2$ by weight, and, optionally, between about 0.5% and about 5% $Y_2O_3$ by weight.

In a specific embodiment, first glass-ceramic layer 20 includes between about 10% and about 40% glass phase content by volume, and includes $B_2O_3$ as the glass stabilizer, more specifically between about 1% and about 5% $B_2O_3$ by weight, even more specifically between about 1% and about 2% $B_2O_3$ by weight. In one aspect of this specific embodiment, second glass-ceramic layer 30 includes between about 5% and about 25% glass phase content by volume.

In another specific embodiment, first glass-ceramic layer 20 includes between about 10% and about 40% glass phase content by volume, and includes between about 1% and about 5% $B_2O_3$ by weight, between about 2% and 12% $Al_2O_3$ by weight, between about 35% and between about 55% BaO by weight, between about 30% and about 45% $SiO_2$ by weight, between about 0.5% and about 3% $TiO_2$ by weight, and, optionally, between about 0.5% and about 25% $Y_2O_3$ by weight.

In yet another specific embodiment, first glass-ceramic layer 20 has the features described in the preceding paragraph; and second glass-ceramic layer 30 includes between about 5% and about 25% glass phase content by volume, and includes between about 10% and about 15% $Al_2O_3$ by weight, between about 35% and between about 55% BaO by weight, between about 30% and about 45% $SiO_2$ by weight, between about 0.5% and about 3% $TiO_2$ by weight, and, optionally, between about 0.5% and about 5% $Y_2O_3$ by weight.

Referring now to FIG. 1B, first ceramic component 10 that is to be sealed supports sealing component 15 that includes first glass-ceramic layer 20, second glass-ceramic layer 30, and third glass-ceramic layer 40 between first and second glass-ceramic layers 20 and 30, wherein third glass-ceramic layer 40 includes a lower glass phase content than first glass-ceramic layer 20 and includes a higher glass phase content than second glass-ceramic layer 30. Features, including specific features, of first ceramic component 10, first and second glass-ceramic layers 20 and 30 are independently as described above. Typically, third glass-ceramic layer 40 includes between about 0.5% and about 50% glass phase content by volume. In a specific embodiment, third glass-ceramic layer 40 independently includes between about 1% and about 50% glass phase content by volume. In another specific embodiment, third glass-ceramic layer 40 independently includes between about 5% and about 50% glass phase content by volume. In yet another specific embodiment, third glass-ceramic layer 40 independently includes between about 10% and about 30% glass phase content by volume.

In a specific embodiment, first glass-ceramic layer 20 includes between about 10% and about 40% glass phase content by volume, second glass-ceramic layer 30 includes between about 5% and about 25% glass phase content by volume, and third glass-ceramic layer 40 includes between about 10% and about 30% glass phase content by volume.

In another specific embodiment, each of first, second and third glass-ceramic layers 20, 30 and 40 independently includes $SiO_2$, and independently can further include at least one compound selected from the group consisting of $Al_2O_3$, BaO, CaO, MgO, ZnO, SrO, $TiO_2$, and, optionally, $Y_2O_3$. In a specific embodiment, each of first and second glass-ceramic layers 20 and 30 independently includes $SiO_2$, $Al_2O_3$, BaO, $SiO_2$, $TiO_2$ and, optionally, $Y_2O_3$, wherein their contents, including specific contents, are as described above with respect to FIG. 1A. In another specific embodiment, third glass-ceramic layer 40 includes $SiO_2$, $Al_2O_3$, BaO, $SiO_2$, $TiO_2$ and, optionally, $Y_2O_3$.

In a specific embodiment, first glass-ceramic layer 20 includes between about 10% and about 40% glass phase content by volume, and includes $B_2O_3$ as the glass stabilizer, more specifically between about 1% and about 5% $B_2O_3$ by weight, even more specifically between about 1% and about 2% $B_2O_3$ by weight. In one aspect of this specific embodiment, second glass-ceramic layer 30 includes between about 5% and about 25% glass phase content by volume.

In another specific embodiment, first glass-ceramic layer 20 includes between about 10% and about 40% glass phase content by volume, and includes between about 1% and about 5% $B_2O_3$ by weight, more specifically between about 1% and about 2% $B_2O_3$ by weight, between about 2% and 12% $Al_2O_3$ by weight, between about 35% and between about 55% BaO by weight, between about 30% and about 45% $SiO_2$ by weight, between about 0.5% and about 3% $TiO_2$ by weight, and, optionally, between about 0.5% and about 25% $Y_2O_3$ by weight.

In yet another specific embodiment, first glass-ceramic layer 20 has the features described in the preceding paragraph; and second glass-ceramic layer 30 includes between about 5% and about 25% glass phase content by volume, and includes between about 10% and about 15% $Al_2O_3$ by weight, between about 35% and between about 55% BaO by weight, between about 30% and about 45% $SiO_2$ by weight, between about 0.5% and about 3% $TiO_2$ by weight, and, optionally, between about 0.5% and about 5% $Y_2O_3$ by weight.

In still another specific embodiment, each of first glass-ceramic layer 20 and second glass-ceramic layer 30 has the features described in the preceding paragraph; and third glass-ceramic layer 40 includes between about 5% and 25% glass phase content by volume, and includes between about 10% and about 15% $Al_2O_3$ by weight, between about 35% and between about 55% BaO by weight, between about 30% and about 45% $SiO_2$ by weight, between about 0.5% and about 3% $TiO_2$ by weight, and between about 0.5% and about 5% $Y_2O_3$ by weight.

Referring now to FIG. 2, sealing component 15 includes third glass-ceramic layer 50 over first and second glass-ceramic layers 20 and 30. In the figure, first ceramic component 10 and second ceramic component 60 are connected or bonded to each other with sealing component 15. Features, including specific features, of first and second glass-ceramic layers 20 and 30 are each independently as described above for FIG. 1A. Features, including specific features, of second ceramic component 60 are as described above for first ceramic component 10 for FIG. 1A. Typically, features, including specific features, of third glass-ceramic layer 50 are as described for first glass-ceramic layer 20 for FIG. 1A.

Typically, each of first and third glass-ceramic layers 20 and 50 independently includes a glass stabilizer component that includes one or more glass stabilizers. Specific examples and contents, including specific examples and contents of the glass stabilizers in first and third glass-ceramic layers 20 and 50 are as described above for first glass-ceramic layer 20 for FIG. 1A. In a specific embodiment, the glass stabilizer component of each of first and third glass-ceramic layers 20 and 50 independently includes at least one compound selected from the group consisting of $B_2O_3$, $Bi_2O_3$, $Li_2O$, $Na_2O$, $K_2O$, $Rb_2O$, $Cs_2O$, $Sb_2O_3$, SnO, $La_2O_3$, and PbO, more specifically $B_2O_3$.

In a specific embodiment, each of first and third glass-ceramic layers 20 and 50 independently includes between about 10% and about 40% glass phase content by volume, and includes $B_2O_3$ as the glass stabilizer, more specifically between about 1% and about 5% $B_2O_3$ by weight, even more specifically between about 1% and about 2% $B_2O_3$ by weight. In one aspect of this specific embodiment, second glass-ceramic layer 30 includes between about 5% and about 25% glass phase content by volume. In embodiments illustrated in FIG. 2 that include two ceramic components 10 and 60, the glass phase content of the first and third glass-ceramic layers that are adjacent to the first and second ceramic components, respectively, preferably have a higher glass phase content than the second glass-ceramic layer.

In another specific embodiment, each of first and third glass-ceramic layers 20 and 50 independently includes between about 10% and about 40% glass phase content by volume, and includes between about 1% and about 5% $B_2O_3$ by weight, between about 2% and 12% $Al_2O_3$ by weight, between about 35% and between about 55% BaO by weight, between about 30% and about 45% $SiO_2$ by weight, between about 0.5% and about 3% $TiO_2$ by weight and, optionally, between about 0.5% and about 25% $Y_2O_3$ by weight.

In yet another specific embodiment, each of first and third glass-ceramic layers 20 and 50 has the features described in the preceding paragraph; and second glass-ceramic layer 30 includes between about 5% and about 25% glass phase content by volume, and includes between about 10% and about 15% $Al_2O_3$ by weight, between about 35% and between about 55% BaO by weight, between about 30% and about 45% $SiO_2$ by weight, between about 0.5% and about 3% $TiO_2$ by weight and, optionally, between about 0.5% and about 5% $Y_2O_3$ by weight.

In still another specific embodiment, sealing component 15 includes first glass-ceramic layer 20 that includes composition Prep B or C of Table 1 below; and second glass-ceramic layer 30 that includes composition Prep A of Table 1 below.

TABLE 1

Chemical compositions of the materials used in the development of multi-layer seals

| Glass | Oxide wt % | | | | | | Description |
|---|---|---|---|---|---|---|---|
| | $Al_2O_3$ | $B_2O_3$ | BaO | $SiO_2$ | $TiO_2$ | $Y_2O_3$ | |
| Prep A | 13 | 0 | 48 | 37 | 2 | 2 | Barium alumino-silicate |
| Prep B | 11.5 | 1.5 | 48 | 37 | 2 | 2 | Prep A + 1.5% $B_2O_3$ |
| Prep C | 3.5 | 1.5 | 42.5 | 36 | 2 | 18 | Prep A – some $Al_2O_3$ + some $Y_2O_3$ |

In one aspect of this embodiment, sealing component 15 further includes third glass-ceramic layer 40 that includes composition Prep A of Table 1. In another aspect of this embodiment, sealing component 15 further includes third glass-ceramic layer 50 that includes composition Prep B or C of Table 1.

In some embodiments, the fuel cells of the invention are solid oxide fuel cells that include ceramic cathodes, ceramic anodes and ceramic electrolytes. In some specific embodiments, the solid oxide fuel cells of the invention include ceramic interconnects.

Any suitable anode and cathode materials known in the art can be used in the invention. Specific examples of the ceramic cathode materials include includes a La-manganate based material (e.g., $La_{1-x}MnO_3$, where x=0-0.1). In a specific embodiment, the La-manganate based materials are doped with one or more suitable dopants, such as Sr, Ca, Ba or Mg. Examples of doped La-manganate based materials include LaSr-manganates (e.g., $La_{1-x}Sr_xMnO_3$, where x=0.1-0.3, (La+Sr)/Mn=1.0-0.95 (molar ratio)) and LaCa-manganates (e.g., $La_{1-x}Ca_xMnO_3$, where x=0.1-0.3, (La+Ca)/Mn=1.0-0.95 (molar ratio)). Specific examples of the anode materials includes a Ni cermet. The "Ni cermet" generally refers to a ceramic metal composite that includes Ni, such as about 20 wt %-70 wt % of Ni. Examples of Ni cermets are materials that include Ni and yttria-stabilized zirconia (YSZ), such as $ZrO_2$ containing about 15 wt % of $Y_2O_3$, and materials that include Ni and YSr-zirconia.

Any suitable electrolyte material known in the art can be employed in the invention. In a specific embodiment, a solid electrolyte, such as ceramic electrolyte, is employed in the invention. Specific examples include $ZrO_2$ based materials, such as $Sc_2O_3$-doped $ZrO_2$, $Y_2O_3$-doped $ZrO_2$, and $Yb_2O_3$-doped $ZrO_2$; $CeO_2$ based materials, such as $Sm_2O_3$-doped $CeO_2$, $Gd_2O_3$-doped $CeO_2$, $Y_2O_3$-doped $CeO_2$ and CaO-doped $CeO_2$; Ln-gallate based materials (Ln=a lanthanide, such as La, Pr, Nd or Sm), such as $LaGaO_3$ doped with Ca, Sr, Ba, Mg, Co, Ni, Fe or a mixture thereof (e.g., $La_{0.8}Sr_{0.2}Ga_{0.8}Mg_{0.2}O_3$, $La_{0.8}Sr_{0.2}Ga_{0.8}Mg_{0.15}Co_{0.05}O_3$, $La_{0.9}Sr_{0.1}Ga_{0.8}Mg_{0.2}O_3$, $LaSrGaO_4$, $LaSrGa_3O_7$ or $La_{0.9}A_{0.1}Ga_3$ where A=Sr, Ca or Ba); and mixtures thereof. Other examples include doped yttrium-zirconate (e.g., $YZr_2O_7$), doped gadolinium-titanate (e.g., $Gd_2Ti_2O_7$) and brown millerites (e.g., $Ba_2In_2O_6$ or $Ba_2In_2O_5$).

Any suitable thickness of the anode(s) and cathode(s) can be employed in the invention. In one specific embodiment, the thickness of the anode(s) and cathode(s) of the fuel cells of the invention is each independently in a range of between about 0.5 mm and about 2 mm.

Any suitable thickness of the electrolyte(s) can be employed in the invention. In one specific embodiment, the thickness of the electrolyte(s) of the fuel cells of the invention is in a range of between about 5 µm and about 20 µm, such as between about 5 µm and about 10 µm. Alternatively, the thickness of the electrolyte(s) of the fuel cells of the invention can be thicker than about 100 µm (e.g., between about 100 µm and about 500 µm).

A schematic view of fuel cell 100 of the invention is provided in FIG. 3. Sealing component 15, shown in FIG. 3 with three layers, 20, 30, and 40, enables gas-tight operation of sub-cells 102. Fuel cell 100 can include any suitable number of sub-cells 102, wherein each sub-cell 102 includes anode 104, cathode 106, and electrolyte 108 between anode 104 and cathode 106. In one embodiment, fuel cell 100 of the invention includes at least 30-50 sub-cells 102. Sub-cells 102 are connected to each other via interconnect 110. Sub-cells 102 can be connected in series or in parallel. Any suitable interconnect can be used in the invention. In a specific embodiment, the interconnect is a metal oxide interconnect, such as ceramic interconnect. Alternatively, the interconnect can be a metal interconnect.

Figure 5:
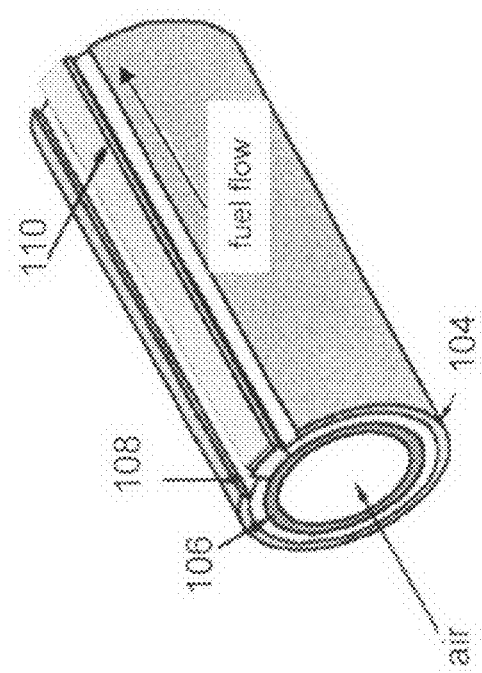
FIG. 5 is a schematic diagram of components of a tubular fuel cell.
Figure 4:
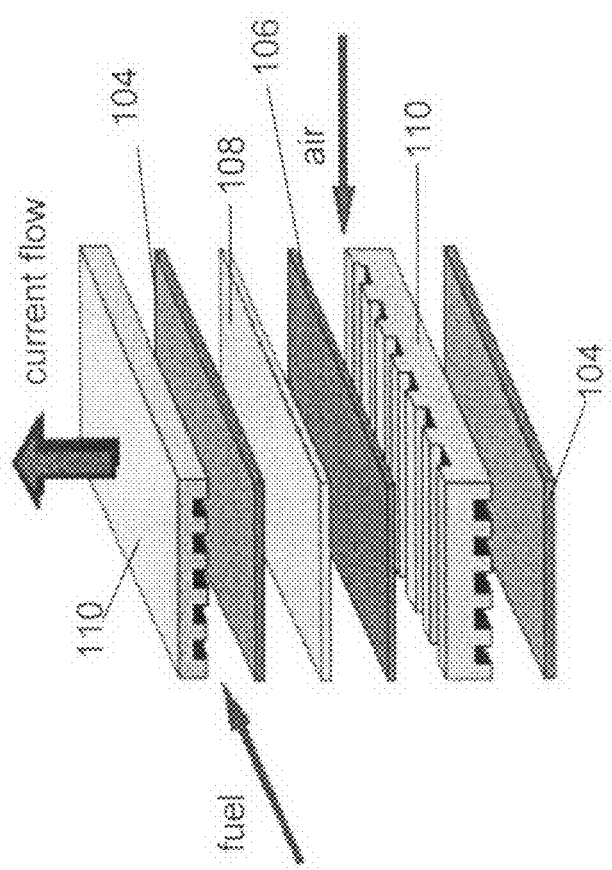
FIG. 4 is an exploded view of components of a planar fuel cell.

Fuel cell 100 can be a planar stacked fuel cell, as shown in FIG. 4. Alternatively, as shown in FIG. 5, fuel cell 100 can be a tubular fuel cell. Sealing component 15, not shown in FIGS. 4 and 5 enables gas-tight operation of planar or tubular fuel cells. Typically, in the planar design, as shown in FIG. 4, the components are assembled in flat stacks, with air and fuel flowing through channels built into the interconnect. Typically, in the tubular design, as shown in FIG. 5, the components are assembled in the form of a hollow tube, with the cell constructed in layers around a tubular cathode; air flows through the inside of the tube and fuel flows around the exterior.

The invention also includes a method of forming fuel cells as described above. The method includes forming a plurality of sub-cells 102 as described above, and connecting each sub-cell 102 with interconnect 110. Fabrication of sub-cells 102 and interconnect 110 can employ any suitable techniques known in the art. For example, planar stacked fuel cells of the invention can be fabricated by particulate processes or deposition processes. Tubular fuel cells of the invention can be fabricated by having the cell components in the form of thin layers on a porous cylindrical tube, such as calcia-stabilized zirconia.

Typically, a suitable particulate process, such as a tape casting or tape calendering, involves compaction of powders, such as ceramic powders, into fuel cell components (e.g., electrodes, electrolytes and interconnects) and densification at elevated temperatures. For example, suitable powder materials for electrolytes, electrodes or interconnects of the invention, are made by solid state reaction of constituent oxides. Suitable high surface area powders can be precipitated from nitrate and other solutions as a gel product, which are dried, calcined and comminuted to give crystalline particles. The deposition processes can involve formation of cell components on a support by a suitable chemical or physical process. Examples of the deposition include chemical vapor deposition, plasma spraying and spray pyrolysis.

Figure 6A:
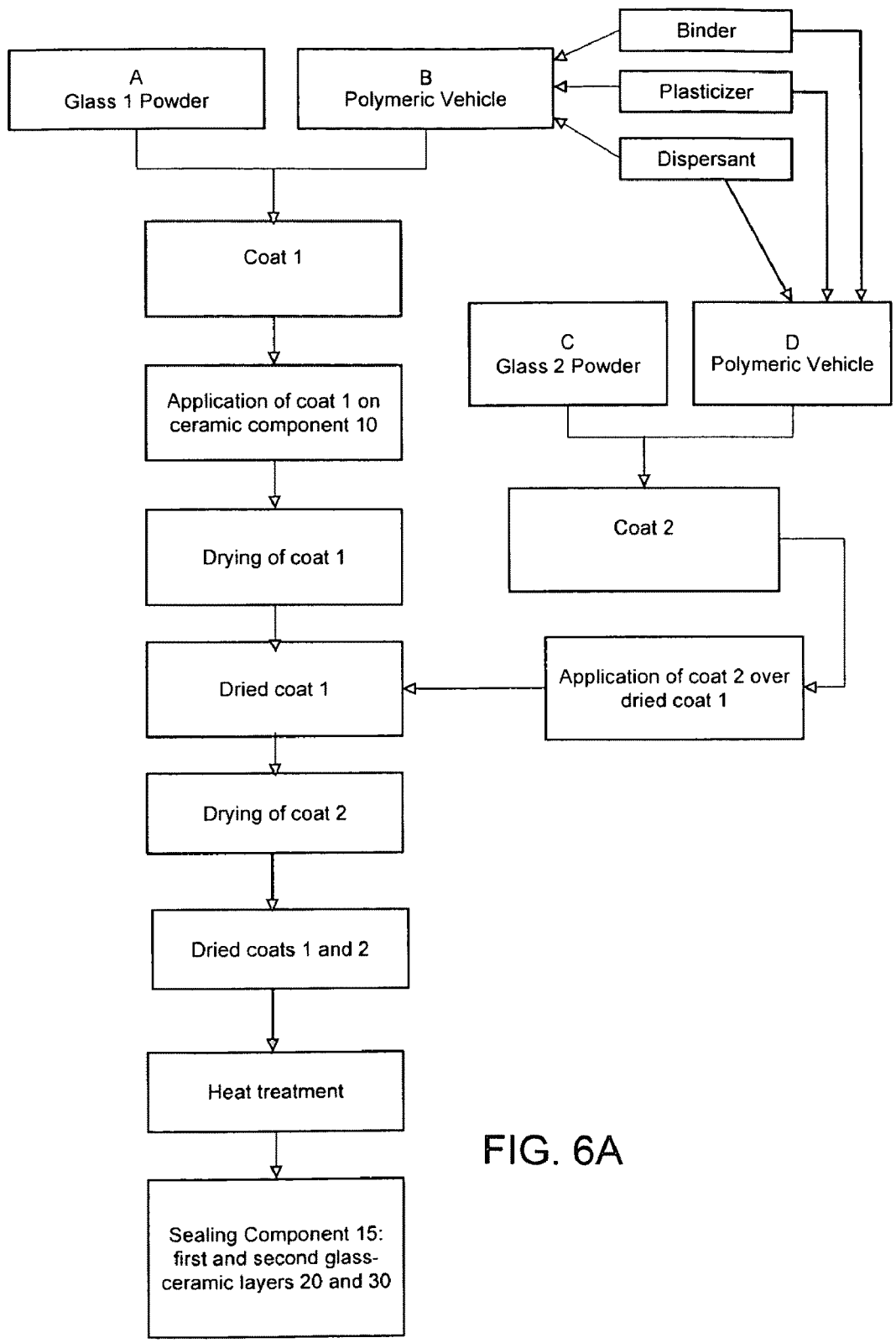
FIG. 6A is a block diagram of a method of the invention for sealing a ceramic component of a fuel cell with two glass-ceramic layers.

As described above, one or more ceramic components of fuel cell 100, such as electrodes 104 and 106, electrolyte 108, and interconnect 110, can be sealed or bonded with sealing component 15. One embodiment of the methods of the invention for sealing a ceramic component of a fuel cell is depicted in FIG. 6A. Referring now to FIG. 6A, sealing a ceramic component (e.g., first ceramic component 10 in FIG. 1A) of fuel cell 100 includes applying coat 1 over first ceramic component 10. Coat 2 is then applied over coat 1. Controlled heat treatment of coats 1 and 2 forms sealing component 15 that includes first and second glass-ceramic layers 20 and 30, respectively. Features, including specific features, of each of first and second glass-ceramic layers 20 and 30 independently are as described above for FIG. 1A. Application of coats 1 and 2 can be done using any suitable method known in the art. For example, a doctor blade can be used in applying coats 1 and 2. Typical coating thicknesses are in the range from 100 µm to 2 mm.

As shown in FIG. 6A, coat 1 typically includes glass 1 powder and optionally a polymeric vehicle that includes at least one of a binder, a plasticizer and a dispersant. In a specific embodiment, glass 1 powder includes $SiO_2$, and further includes between about 0.5% and about 10%, by weight glass stabilizer component that includes one or more glass stabilizers. As shown in FIG. 6A, coat 2 typically includes glass 2 and optionally a polymeric vehicle that includes at least one of a binder, a plasticizer and a dispersant. In a specific embodiment, the glass 2 powder includes $SiO_2$. Examples, including specific examples, of glass stabilizers and their amounts, including specific amounts, are as described above for FIG. 1A.

In another specific embodiment, each of glass 1 powder and glass 2 powder independently includes $SiO_2$, and can independently further include at least one compound selected from the group consisting of $Al_2O_3$, BaO, CaO, MgO, ZnO, SrO, $TiO_2$, and $Y_2O_3$. In a specific embodiment, each of glass 1 powder and glass 2 powder independently includes $SiO_2$, $Al_2O_3$, BaO, $SiO_2$, $TiO_2$ and $Y_2O_3$. In a further specific embodiment, glass 1 powder includes between about 2% and 12% $Al_2O_3$ by weight, between about 35% and between about 55% BaO by weight, between about 30% and about 45% $SiO_2$ by weight, between about 0.5% and about 3% $TiO_2$ by weight, and between about 0.5% and about 25% $Y_2O_3$ by weight. In still another specific embodiment, glass 2 powder includes between about 10% and about 15% $Al_2O_3$ by weight, between about 35% and between about 55% BaO by weight, between about 30% and about 45% $SiO_2$ by weight, between about 0.5% and about 3% $TiO_2$ by weight, and between about 0.5% and about 5% $Y_2O_3$ by weight. Each of coats 1 and 2, including a polymeric vehicle, generally is in a slurry form. In a specific embodiment, each of coats 1 and 2 includes about 70% by weight powder (e.g., glass powder 1 or 2) and about 30% by weight polymeric vehicle. Any suitable polymeric vehicle, binder, plasticizer, and dispersant known in the art can be employed in the invention.

In an embodiment, each of coats 1 and 2 includes a polymeric vehicle that includes at least one of a binder, a plasticizer and a dispersant, and the heating step of coats 1 and 2 is performed in three stages: coats 1 and 2 are maintained at a first temperature range sufficient to cause formation of polymeric-vehicle-deficient layers, thereafter maintaining the polymeric-vehicle-deficient layers at a second temperature range sufficient to cause formation of sintered layers, and thereafter maintaining the sintered layers at a third temperature range sufficient to cause formation of first and second glass-ceramic layers 20 and 30.

In a specific embodiment, the first temperature range is between about 200° C. and about 600° C., the second temperature range is between about 700° C. and about 1050° C., and the third temperature range is between about 800° C. and about 1100° C. In another specific embodiment, maintenance of the layers at least one of the first, the second, and the third temperature ranges includes maintaining the layers at a first temperature and thereafter maintaining the layers at a second temperature distinct from the first temperature. In another specific embodiment, coats 1 and 2 are maintained at each of the first, second, and third temperature ranges for a time period of between about 30 minutes and about 300 minutes, specifically, between about 30 minutes and about 60 minutes.

Figure 6B:
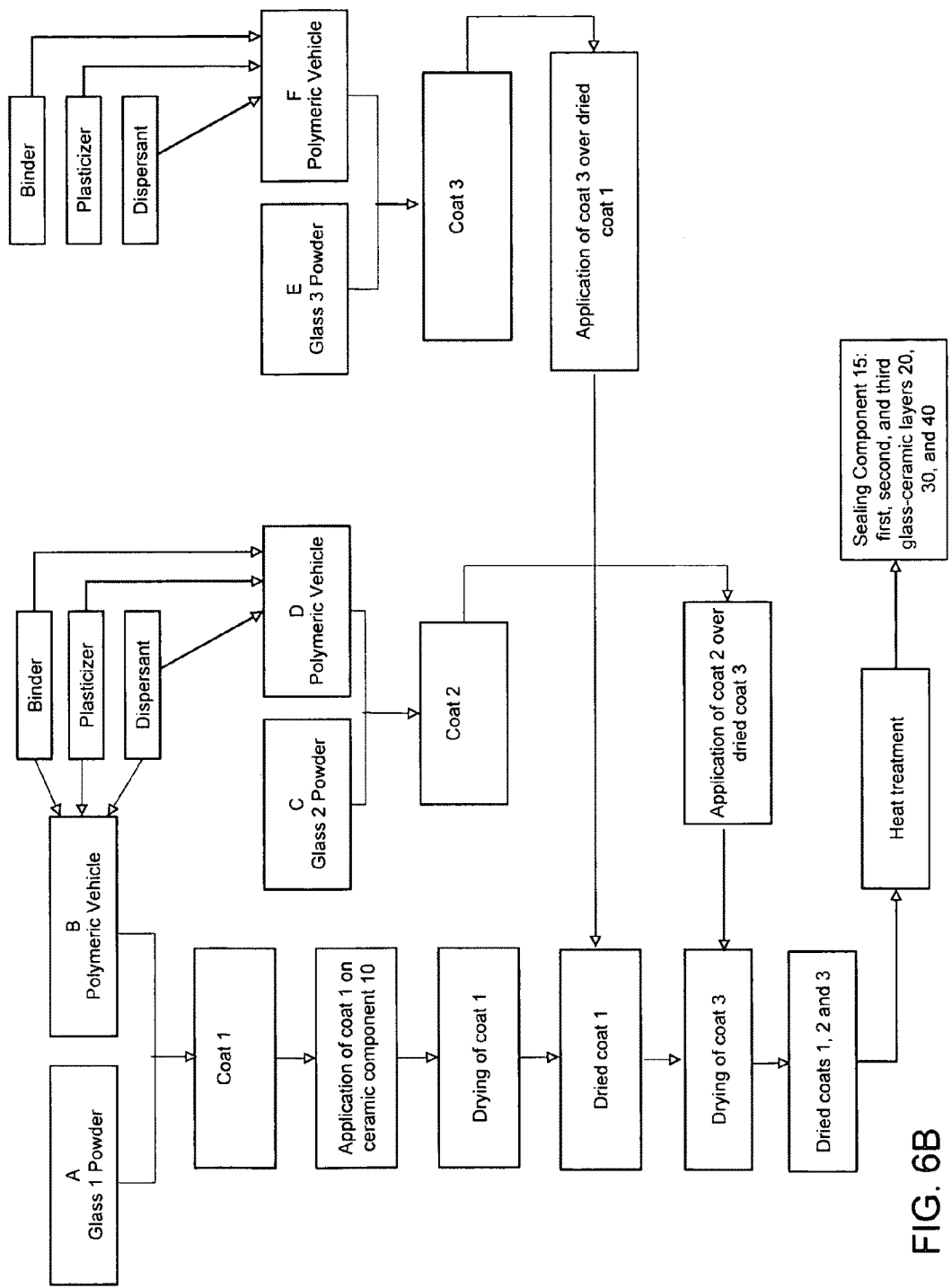
FIG. 6B is a block diagram of a method of the invention for sealing a ceramic component of a fuel cell with three glass-ceramic layers.

Referring now to FIG. 6B, sealing a ceramic component (e.g., ceramic component 10 in FIG. 1A) of fuel cell 100 includes applying coat 1 over first ceramic component 10. Coat 3 is then applied over coat 1, and subsequently coat 2 is applied over coat 3. Controlled heat treatment of coats 1, 2, and 3 forms sealing component 15 that includes first, second, and third glass-ceramic layers 20, 30, and 40, respectively. Features, including specific features, of each of first and second glass-ceramic layers 20 and 30 independently are as described above for FIG. 1A. Features, including specific features, of third glass-ceramic layer 40 are as described above for FIG. 1B. Features, including specific features, of the composition and application of coats 1 and 2 (including glass 1 powder and glass 2 powder), independently are as described above for FIG. 6A. Application of coat 3 can be done using any suitable method known in the art. For example, a doctor blade can be used in applying coat 3.

As shown in FIG. 6B, coat 3 typically includes glass 3 powder and optionally a polymeric vehicle that includes at least one of a binder, a plasticizer and a dispersant. In a specific embodiment, glass 3 powder includes $SiO_2$. In another specific embodiment, glass 3 powder includes $SiO_2$, $Al_2O_3$, BaO, $SiO_2$, $TiO_2$ and $Y_2O_3$. In another further specific embodiment, glass 3 powder includes between about 10% and about 15% $Al_2O_3$ by weight, between about 35% and between about 55% BaO by weight, between about 30% and about 45% $SiO_2$ by weight, between about 0.5% and about 3% $TiO_2$ by weight, and between about 0.5% and about 5% $Y_2O_3$ by weight. Each of coats 1, 2 and 3, including a polymeric vehicle, generally is in a slurry form. In a specific embodiment, each of coats 1, 2, and 3 includes about 70% by weight powder (e.g., glass powder 1, 2, or 3) and about 30% by weight polymeric vehicle.

In a specific embodiment, each of coats 1, 2, and 3 includes a polymeric vehicle that includes at least one of a binder, a plasticizer and a dispersant, and the heating step of coats 1, 2, and 3 is performed in three stages: coats 1, 2, and 3 are maintained at a first temperature range sufficient to cause formation of polymeric-vehicle-deficient layers, thereafter maintaining the polymeric-vehicle-deficient layers at a second temperature range sufficient to cause formation of sintered layers, and thereafter maintaining the sintered layers at a third temperature range sufficient to cause formation of first, second, and third glass-ceramic layers 20, 30, and 40. The heat treatment of coats 1, 2, and 3 is as described above for FIG. 6A.

Figure 6C:
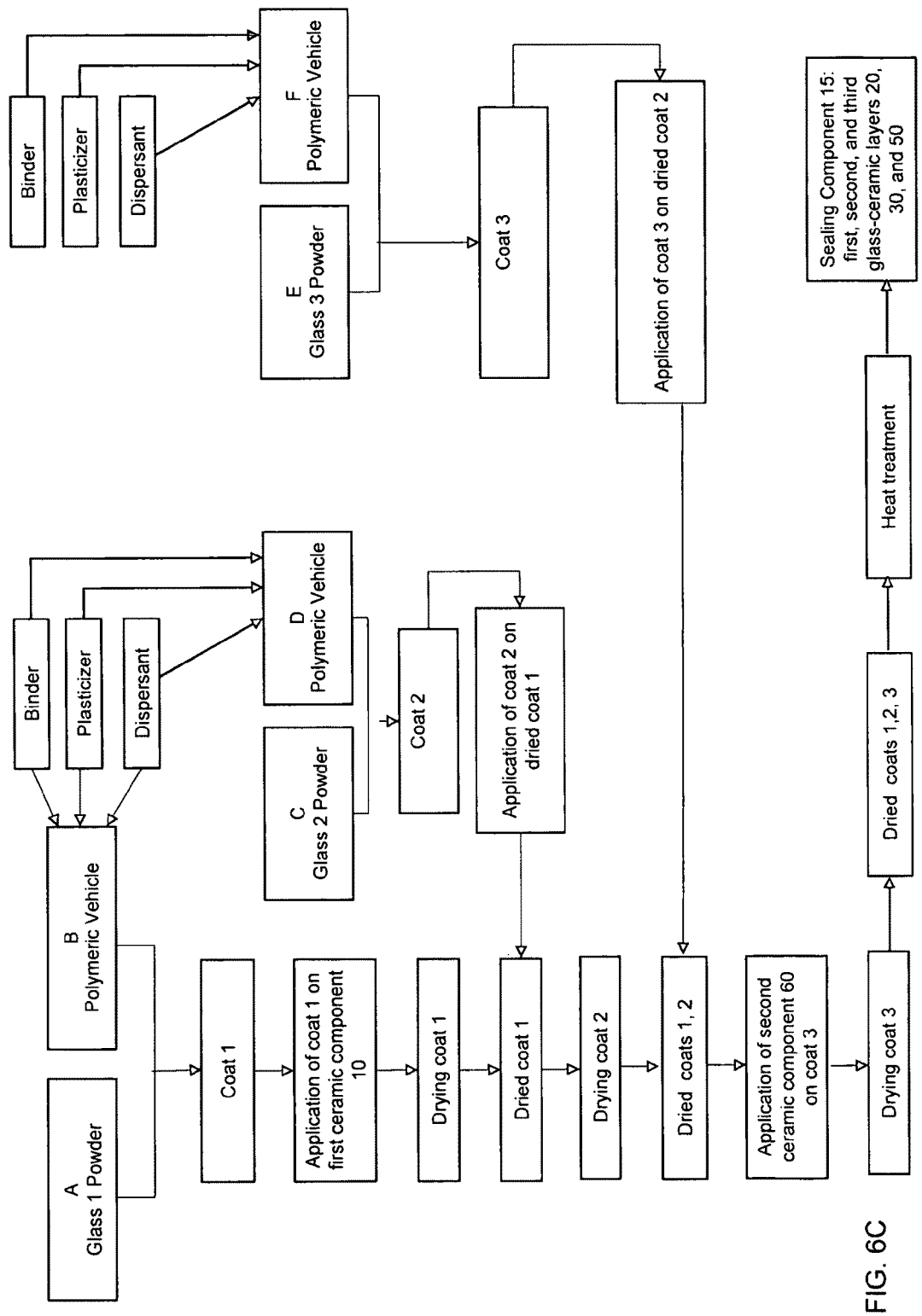
FIG. 6C is a block diagram of a method of the invention for bonding two fuel cell components with multiple glass-ceramic layers.

Referring now to FIG. 6C, bonding ceramic component 10 to second ceramic component 60 of a fuel cell of the invention includes applying coat 1 on first ceramic component 10. Coat 2 is applied over coat 1. Coat 3 is then applied over coat 2, and second ceramic component 60 is subsequently applied over coat 3. Controlled heat treatment of coats 1, 2, and 3 forms sealing component 15 that includes first, second, and third glass-ceramic layers 10, 20, and 50, respectively, between first ceramic component 10 and second ceramic component 60. Features, including specific features, of each of first, second and third glass-ceramic layers 20, 30, and 50 independently are as described above for FIG. 2. Features, including specific features, of the composition and application of coats 1 and 2 (including glass 1 powder and glass 2 powder), independently are as described above for FIG. 6A. Features, including specific features, of the composition and application of coat 3 (including glass 3 powder) are as described above for coat 1 of FIG. 6A. Each of coats 1, 2 and 3, including a polymeric vehicle, generally is in a slurry form. In a specific embodiment, each of coats 1, 2, and 3 includes about 70% by weight powder (e.g., glass powder 1, 2, or 3) and about 30% by weight polymeric vehicle. Second ceramic component 60 generally is applied over coat 3 before drying layer 3. The heat treatment of coats 1, 2, and 3 is as described above for FIG. 6A.

Figure 7:
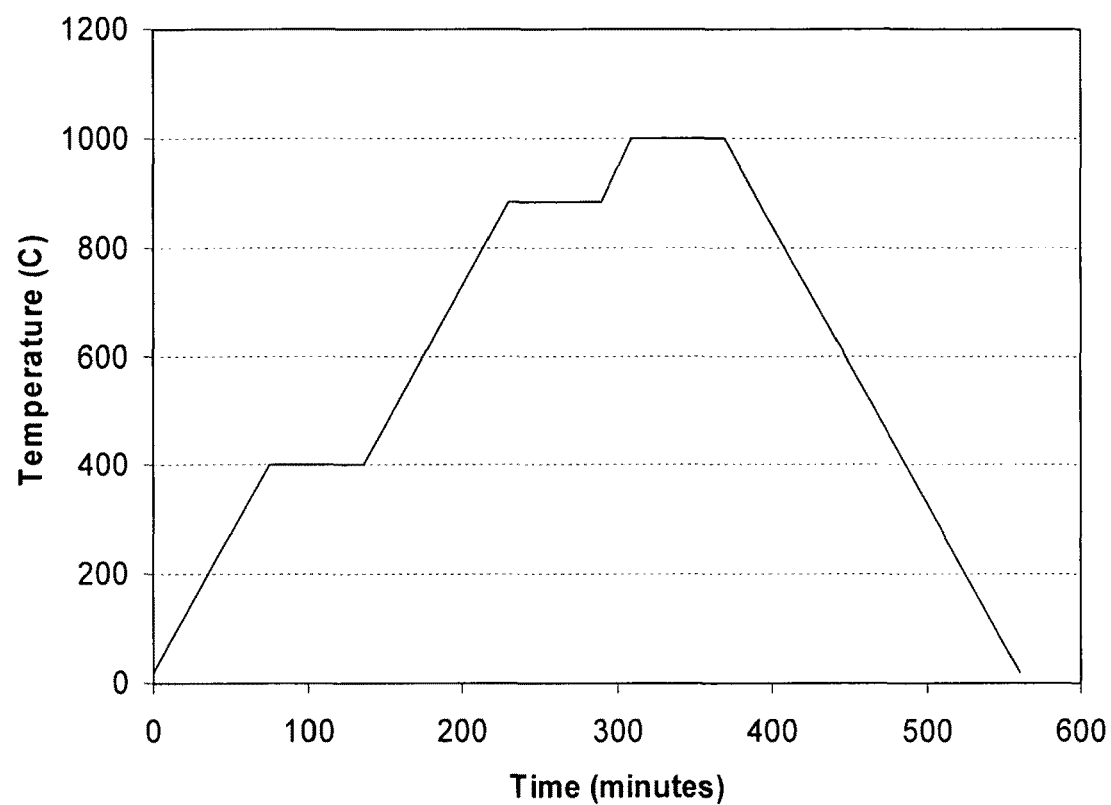
FIG. 7 is a drawing of the method of heating the glass-ceramic layers of the invention using three stages.

FIG. 7 shows a specific example of a heat treatment profile that can be employed in the invention. In particular, the heat treatment profile of FIG. 7 can be employed for multi-layer glass-ceramic seals/bonds of Table 1.

EQUIVALENTS

While this invention has been particularly shown and described with references to example embodiments thereof, it will be understood by those skilled in the art that various changes in form and details may be made therein without departing from the scope of the invention encompassed by the appended claims.

What is claimed is:

1. A fuel cell component, comprising:
a ceramic component comprising an anode and a cathode; and
a sealing component directly contacting at least one of the anode and the cathode, wherein the sealing component includes a first glass-ceramic layer overlying the ceramic component and a second glass-ceramic layer overlying the first glass-ceramic layer, each of the first and the second glass-ceramic layers independently including between about 0.5% and about 50% glass phase content by volume, wherein the first glass-ceramic layer includes a higher glass phase content than the second glass-ceramic layer, and between about 1% and about 5% glass stabilizer component by weight wherein the fuel cell component is a solid oxide fuel cell component, wherein the ceramic component further comprises at least one of an electrolyte and an interconnect, and wherein the sealing component further directly contacts at least two of the anode, the electrolyte, the cathode, and the interconnect.

2. The fuel cell component of claim 1, wherein the glass stabilizer component includes at least one compound selected from the group consisting of $B_2O_3$, $Bi_2O_3$, $Li_2O$, $Na_2O$, $K_2O$, $Rb_2O$, $Cs_2O$, $Sb_2O_3$, SnO, $La_2O_3$, and PbO.

3. The fuel cell component of claim 1, wherein the glass stabilizer component includes $B_2O_3$.

4. The fuel cell component of claim 3, wherein the first glass-ceramic layer includes between about 10% and about 40% glass phase content by volume.

5. The fuel cell component of claim 4, wherein the second glass-ceramic layer includes between about 5% and about 25% glass phase content by volume.

6. The fuel cell component of claim 5, wherein the first glass-ceramic layer includes between about 1% and about 5% $B_2O_3$ by weight.

7. The fuel cell component of claim 6, wherein the first glass-ceramic layer includes between about 1% and about 2% $B_2O_3$ by weight.

8. The fuel cell component of claim 5, wherein each of the first and the second glass-ceramic layers includes $SiO_2$.

9. The fuel cell component of claim 8, wherein each of the first and the second glass-ceramic layers independently further includes at least one compound selected from the group consisting of $Al_2O_3$, BaO, CaO, MgO, ZnO, SrO, $TiO_2$, and $Y_2O_3$.

10. The fuel cell component of claim 9, wherein the first glass-ceramic layer includes between about 2% and 12% $Al_2O_3$ by weight, between about 35% and about 55% BaO by weight, between about 30% and about 45% $SiO_2$ by weight, between about 0.5% and about 3% $TiO_2$ by weight.

11. The fuel cell component of claim 10, wherein the second glass-ceramic layer includes between about 10% and about 15% $Al_2O_3$ by weight, between about 35% and about 55% BaO by weight, between about 30% and about 45% $SiO_2$ by weight, between about 0.5% and about 3% $TiO_2$ by weight.

12. The fuel cell component of claim 1, further comprising a third glass-ceramic layer between the first and the second glass-ceramic layers, wherein the third glass-ceramic layer includes a lower glass phase content than the first glass-ceramic layer, and includes a higher glass phase content than the second glass-ceramic layer.

13. The fuel cell component of claim 1, further comprising a third glass-ceramic layer over the second glass-ceramic layer, and a second ceramic component opposite the first ceramic component and over the third glass-ceramic layer, wherein the third glass-ceramic layer includes between about 0.5% and about 50% glass phase content by volume and includes between about 0.5% and about 10% glass stabilizer component by weight, and wherein the glass phase content of the third glass-ceramic layer is higher than the glass phase content of the second glass-ceramic layer.

14. The fuel cell component of claim 13, wherein the first and the second ceramic components include a component selected from the group consisting of an anode, a cathode, an electrolyte, and an interconnect.

\* \* \* \* \*